(12) United States Patent
Lacroix et al.

(10) Patent No.: US 6,301,118 B1
(45) Date of Patent: Oct. 9, 2001

(54) CONTROL PANEL WITH A PRINTED CIRCUIT, IN PARTICULAR FOR A MOTOR VEHICLE

(75) Inventors: Louis Lacroix, Champigny/Marne; Alain Toussaint, Pontchartrain, both of (FR)

(73) Assignee: Valeo Electronique, Creteil (FR)

( * ) Notice: Subject to any disclaimer, the term of this patent is extended or adjusted under 35 U.S.C. 154(b) by 0 days.

(21) Appl. No.: 09/260,759

(22) Filed: Mar. 2, 1999

(30) Foreign Application Priority Data

Mar. 4, 1998 (FR) .................................................. 98 02631

(51) Int. Cl.⁷ ..................................................... H05K 1/14
(52) U.S. Cl. ........................ 361/736; 361/737; 361/752; 361/726; 235/30 R; 340/459
(58) Field of Search ..................................... 361/736, 737, 361/724–726, 752, 753, 796; 235/30 R, 29 A; 324/166; 340/459

(56) References Cited

U.S. PATENT DOCUMENTS

| | | | |
|---|---|---|---|
| 4,594,007 | * | 6/1986 | Brandenberg ............................ 368/10 |
| 4,789,774 | * | 12/1988 | Koch et al. .......................... 235/30 R |
| 5,099,396 | | 3/1992 | Barz et al. . |
| 5,422,784 | * | 6/1995 | Wakahara et al. .................... 361/680 |
| 5,631,673 | * | 5/1997 | Yamamoto et al. .................. 345/905 |
| 5,652,508 | * | 7/1997 | Yamamoto ........................... 324/166 |

FOREIGN PATENT DOCUMENTS

| | | |
|---|---|---|
| 31 13 509 | 1/1982 | (DE) . |
| 39 03 229 | 2/1989 | (DE) . |
| 43 34 355 | 4/1995 | (DE) . |
| 0 478 218 | 4/1992 | (EP) . |

OTHER PUBLICATIONS

French Search Report dated Nov. 13, 1998 (FA 555 339: FR 9802631).

* cited by examiner

Primary Examiner—Jeffrey Gaffin
Assistant Examiner—Tuan Dinh
(74) Attorney, Agent, or Firm—Morgan & Finnegan, LLP

(57) ABSTRACT

A control panel or control unit for a motor vehicle heating and air conditioning circuit comprises a body having a front panel, and contains a printed circuit which comprises a front circuit board located behind the front panel and having an aperture, together with a computer circuit board which makes an angle with the front circuit board. The computer circuit board has an extension portion which passes through the aperture in the front circuit board, and this extension portion carries a display device which is located behind an aperture formed through the front panel. Retaining means, for example adjustable fastening means, are interposed between the computer circuit board and the body so as to secure the display device in a defined position with respect to the front panel.

18 Claims, 2 Drawing Sheets

CONTROL PANEL WITH A PRINTED CIRCUIT, IN PARTICULAR FOR A MOTOR VEHICLE

FIELD OF THE INVENTION

This invention relates to control units, also referred to as control panels, of the type having a printed circuit which is intended most particularly for use in a motor vehicle, especially for the purpose of being actuated by an occupant of the vehicle in order to control some function of the vehicle.

BACKGROUND OF THE INVENTION

Control panels of this type are already known which comprise a body having a front panel, a printed circuit carried by the front panel, and a display device which is connected to the printed circuit and which is located behind a window formed through the front panel. Such a panel may for example be used for controlling an installation for heating and/or air conditioning the cabin of a motor vehicle.

The front panel of the control panel (or control unit) is conventionally incorporated in a substantially vertical position within the fascia or console of the motor vehicle, so that the display device can be visible to the driver. Conventionally again, the front panel contains a keypad consisting of a plurality of touch elements such as buttons or the like, which are arranged to be operated by the driver of the vehicle. The front panel generally contains lighting means for the purpose of illuminating the keypad and various symbols or pictorial displays, especially for use when driving at night. In addition, the front panel usually contains indicator lights such as light emitting diodes, which light up when the control unit is in operation.

Control units of the type just discussed are known in which the printed circuit comprises a single circuit board disposed parallel to the front panel. This arrangement has the disadvantage that it leaves too little space available to accommodate conveniently the electronic components and the connecting tracks associated with the printed circuit.

Control units of the same type are also known in which the printed circuit comprises two circuit boards arranged at right angles to each other, and also arranged to be able to be separated from each other or in contact with each other. This particular arrangement makes it necessary to make some kind of special provision for fastening the display device behind the front panel of the control unit. These fastening means may for example consist of a flexible connection between the display device and one of the circuit boards of the printed circuit, and this then makes it necessary to provide a connection between the two circuit boards.

The said means may also consist of a seal or lugs bearing on the display device, which then makes it necessary to provide a suitable flexible component such as a braid, consisting of connecting wires between the display device itself and one of the printed circuit boards.

All of these arrangements are costly and do not always enable correct retention of the display device in engagement behind the front panel to be guaranteed. As a result of this, vibrations can be set up, and a gap may appear at the perimeter of the display device.

DISCUSSION OF THE INVENTION

A main object of the invention is to overcome the above mentioned drawbacks. A particular object of the invention is to obtain a control panel or control unit of the type discussed above, which enables the display device to be held in correct engagement against the front panel, regardless of any manufacturing tolerances.

According to the invention, a control unit, in particular for a motor vehicle, comprising a body having a front panel, a printed circuit carried by the body, and a display device connected to the printed circuit and located behind a window in the front panel, is characterised in that: the printed circuit comprises a first circuit board, called a "front circuit board" (or keypad interface board), located behind the front panel and having an aperture, together with a second circuit board referred to as a "computer circuit board", which is disposed in such a way as to define a given angle with respect to the front circuit board, the computer circuit board including an extension portion adapted to pass through the aperture in the front circuit board; in that the said extension portion carries the display device; and in that retaining means are interposed between the computer circuit board and the body for holding the display device in a defined position with respect to the front panel.

Thus, the control unit of the invention has two printed circuit boards which are disposed so as to make an angle between them, and which interpenetrate due to the fact that the extension portion of the computer circuit board passes through the aperture in the front circuit board, which extension portion carries the display device itself.

Because of the above mentioned retaining means, the position of the computer circuit board can be easily adjusted in such a way that the display device will be in a position which is defined with respect to the front panel, that is to say generally in direct or indirect engagement with, and behind, a rear face of the front panel. As a result, the display device is held firmly flat against the back of the front panel, avoiding any gap or clearance, and this improves sealing against the ingress of dust, besides improving the general appearance. In addition, it eliminates any risk of noise due to vibration, and enables the effect of manufacturing tolerances to be ignored. A further advantage of this arrangement is that it reduces the connections between the display device and the computer circuit board, and gives improved protection against electrical discharges, by separating the connecting system from the front panel.

In a preferred embodiment of the invention, the front circuit board and the computer circuit board are disposed at right angles to each other. Preferably the front circuit board is substantially parallel to a rear face of the front panel, while the computer circuit board is substantially at right angles to the same rear face of the front panel.

The front circuit board preferably carries electrical contacts arranged to establish a connection with a control keypad carried by the front panel and/or with means for illuminating the front panel.

Preferably the front circuit board is a single-face printed circuit carrying two opposed connecting networks, or it may be a double-face printed circuit. As to the computer circuit board, this is preferably a printed circuit of the double-face type.

According to another preferred feature of the invention, the control unit includes electrical means for connecting the front circuit board with the computer circuit board, this connecting means also determining the mutual positioning of the two circuit boards. Such connecting means are arranged to provide the required electrical connections regardless of the mutual positions of the two circuit boards in space, in order to permit adjustment of the position of the computer circuit board.

In a preferred embodiment of the invention, the connecting means include at least one pin-type connector and at least one socket having contacts for making mutual electrical contact.

Preferably, the connecting means comprise at least one connector carried by the front circuit board, and at least one socket carried by the computer circuit board. In one embodiment, the front circuit board and the computer circuit board carry respectively two connectors and two sockets. In that case, the pins of the connectors preferably extend at right angles to the front circuit board.

In another embodiment of the invention, the connection means comprise a flexible element made up of electrical conductors, such as a braid or the like.

The retaining means may be made in the form of adjustable fastening means. Such adjustable means preferably comprise at least one screw which is arranged to extend through an oblong hole formed through the computer circuit board, the screw then being arranged to engage in a hole in the body. In another version, the retaining means may be made in the form of means which act as permanent springs.

According to a further preferred feature of the invention, the control unit includes resilient means which are arranged to bias the computer circuit board towards the front panel, and therefore also to bias the display device towards its predetermined location. These resilient means may consist of fitted springs, for example leaf springs, wire springs, spring clips and so on, and may render it unnecessary to provide retaining and/or fastening screws.

These resilient means preferably include at least one flexible lug carried by the body and arranged to engage against an edge of the computer circuit board.

In one embodiment of the invention, the front circuit board is in direct engagement against the front panel.

In another embodiment, an intermediate block is interposed between the front panel and the front circuit board. The purpose of this is essentially to guide the various elements of the control unit, with the display panel and the actuating touch elements, or to provide walls for locating the light, or again, to provide sealing.

The display device of the control unit of the invention is preferably of the liquid crystal type.

Further features and advantages of the invention will appear more clearly on a reading of the following detailed description of some preferred embodiments of the invention, which is given by way of non-limiting example only and with reference to the accompanying drawings.

DESCRIPTION OF PREFERRED
EMBODIMENTS OF THE INVENTION

Figure 1:
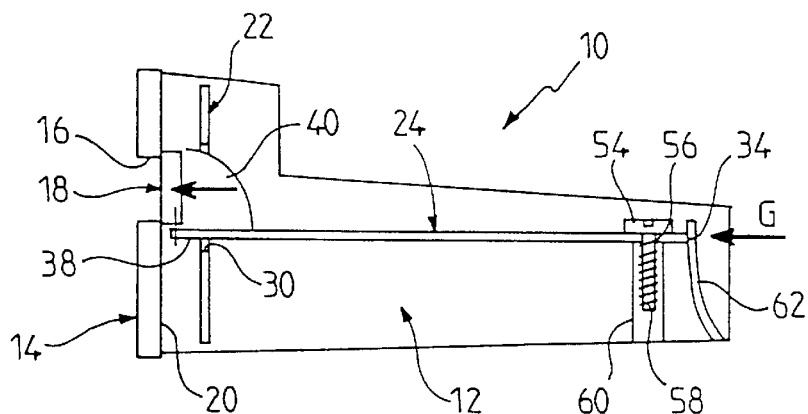
FIG. 1 is a diagrammatic view in transverse cross section of a control unit or control panel in accordance with the invention.

Reference is first made to FIG. 1 which shows a control unit or panel 10, which in this example is arranged to control an installation for heating and air conditioning the cabin of a motor vehicle. The control panel 10 includes a body 12 made in the form of a casing which is moulded in a suitable plastics material. The body 12 includes a front panel, or face panel, 14 which is arranged to be incorporated, in a substantially vertical position, into the fascia or console of the vehicle.

The front panel 14 is formed with a window 16 of generally rectangular form, behind which a display device 18 of the liquid crystal type is placed. In this example, the display device 18 is substantially rectangular and its dimensions are generally greater than those of the window 16, so that it abuts against a rear face 20 of the front panel 14. In another version, the display device may consist of a simple through hole or several through holes, the display device itself consisting of one or more elements.

The body 12 carries a printed circuit which comprises a first circuit board 22, and also a second circuit board 24. The first circuit board 22 is called the front circuit board, and is arranged to be located behind the front panel 14 in a position substantially parallel to the rear face 20 of the latter. The second circuit board 24 is called a computer circuit board, and is arranged so as to lie at right angles to the front circuit board 22. Thus, in the normal position of use of the control panel 10, the front circuit board 22 and the computer circuit board 24 are, respectively, in a substantially vertical position and in a substantially horizontal position.

The front circuit board 22 may also be referred to as a keypad interface board, because it serves essentially as an interface with the front panel 14, which carries the controls and essentially constitutes a keypad or keyboard. The computer circuit board 24 serves essentially to carry the components of the electronic control circuit itself, and possibly electronic regulating means for the control panel, and/or other electronic components that may be incorporated in the unit.

Figure 2:
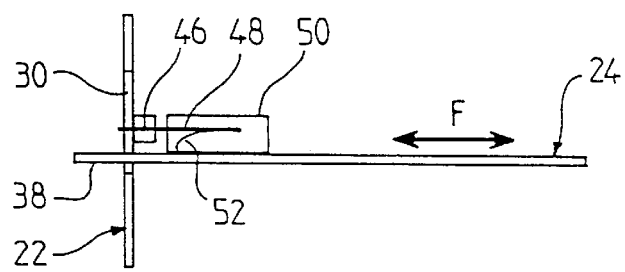
FIG. 2 is a simplified view in cross section, corresponding to FIG. 1 and showing the mutual disposition of the two printed circuit boards, together with one example of means for making connection between the circuit boards.
Figure 3:
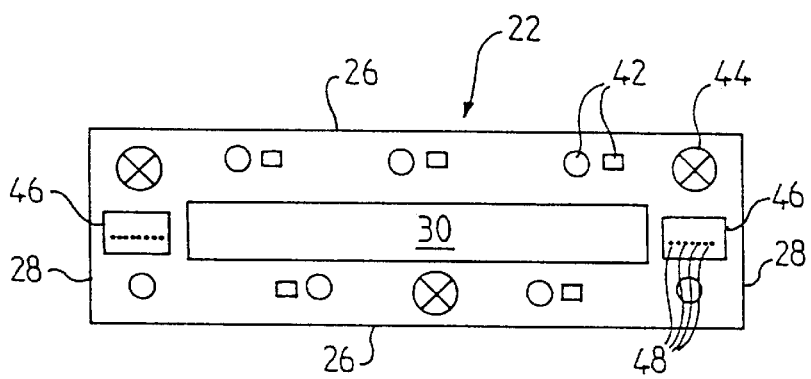
FIG. 3 is a front view of the front circuit board.

The front circuit board 22, as shown in FIGS. 1 to 3, has a form which is matched to the window of the front panel 14, with dimensions smaller than those defined by the edges of the window 16. In this example, the front circuit board 22 is generally rectangular and is bounded by two major sides 26 and two minor sides 28, see FIG. 3. It has a central aperture 30 of generally rectangular form, the sides of which are parallel to the sides 26 and 28. The aperture 30 must be sufficiently large to enable the display device 18, which is in fact carried by the computer circuit board 24, to pass through it.

Figure 4:
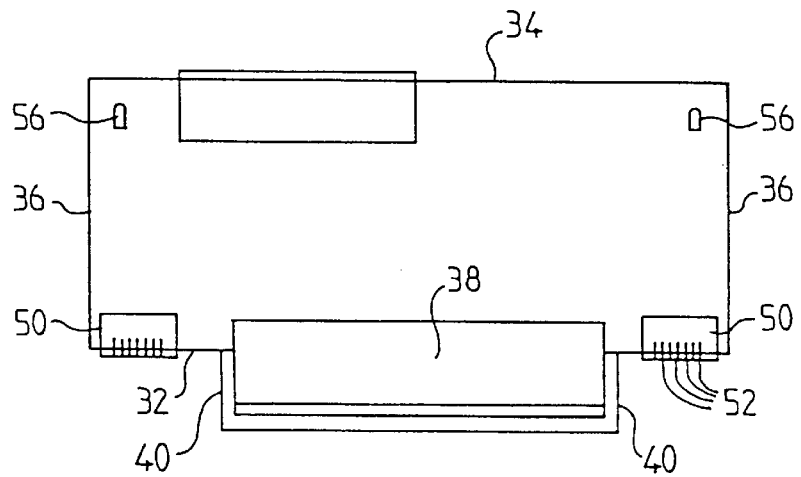
FIG. 4 is a top plan view of the computer circuit board.

The computer circuit board 24, as is best seen in FIG. 4, is generally rectangular in form. It has an anterior edge 32, a posterior edge 34 and two side edges 36. In addition, it has an extension portion 38 of generally rectangular form which extends the board beyond the anterior edge 32. The extension portion 38 has a width which is smaller than the largest dimension of the aperture 30 in the front circuit board 22, so that it is able to pass through the aperture 30. The extension portion 38 supports the display device 18 in a perpendicular position. Side walls 40, FIGS. 1 and 4, are carried by the circuit board 24 adjacent to the extension portion 38, and have a substantially arcuate cross section as shown in FIG. 1. The walls 40 serve to maintain the display device 18 in its position perpendicular to the circuit board 24.

The front circuit board 22 in this example is made in the form of a simple single-face printed circuit board, i.e. the circuit is printed on one side, having two connection arrays, one at each end as shown, for connection of the pattern of connecting strips printed on the board. However, this front circuit board could have any other suitable structure. The circuit board 22 also includes electrical contacts 42 which are arranged to establish connection with lamps or illuminated indicators, together with electrical contacts 44 for establishing connection with control elements such as touch pads, knobs or the like, which form part of the keypad or keyboard incorporated in the front panel 14.

In addition, the front circuit board 22 includes two connectors 46 which are provided with pins 48, each of which is arranged to cooperate with a corresponding socket 50 carried by the computer circuit board 24. The circuit board 24 is a printed circuit of the double-face type, connected to the two sockets 50.

As can be seen in FIG. 2, the connecting pins 48 of the connectors 46 project at right angles to the surface of the front circuit board 22 itself. These pins 48 are arranged to cooperate with contact elements 52 which form part of the sockets 50, so as to establish electrical connection between the two circuit boards 22 and 24 regardless of the position of the computer circuit board 24. In this connection, the latter is adjustable in position as indicated by the double arrow F in FIG. 2, so as to enable the display device 18 to be placed truly flat against the back face 20 of the front panel 14 as shown in FIG. 1.

In this example, two screws 54 are provided for retaining the computer circuit board 24 in position. The screws 54 may extend either upwards or downwards in the housing of the unit. Each of them passes through an oblong hole 56 formed in the circuit board 24, and shown in FIG. 4, and is engaged in the further hole 58 formed in a boss 60 of the body 12, shown in FIG. 1. In another version, the computer circuit board 24 may be retained in position by suitable permanent resilient means, such as clips, instead of by means of screws.

In addition, as can be seen in FIG. 1, a flexible elastic lug 62 carried by the body 12 is arranged to engage against the edge 34 of the computer circuit board 24. This flexible lug, or leaf, biases the circuit board 24 elastically in the direction of the arrow G in FIG. 1, i.e. towards the left in FIG. 1, which helps to maintain the display device 18 in engagement against the back face of the front panel 14. In this way it is possible to adjust the circuit board 24 so as to keep it in a defined position in which the display device 18 is in engagement against the front panel 14. This enables any clearance, and therefore any vibration noise, to be eliminated, regardless of variations in dimensions due to manufacturing tolerances. During assembly, the flexible lugs 62 enable the computer circuit board 24 to be pushed into position so as to obtain perfect contact of the display device 18 against the front panel 14 without any clearance. The two screws 54 can then be tightened so as to secure the board 24 in the position which is thereby preadjusted, and secure the assembly together definitively.

Figure 5:
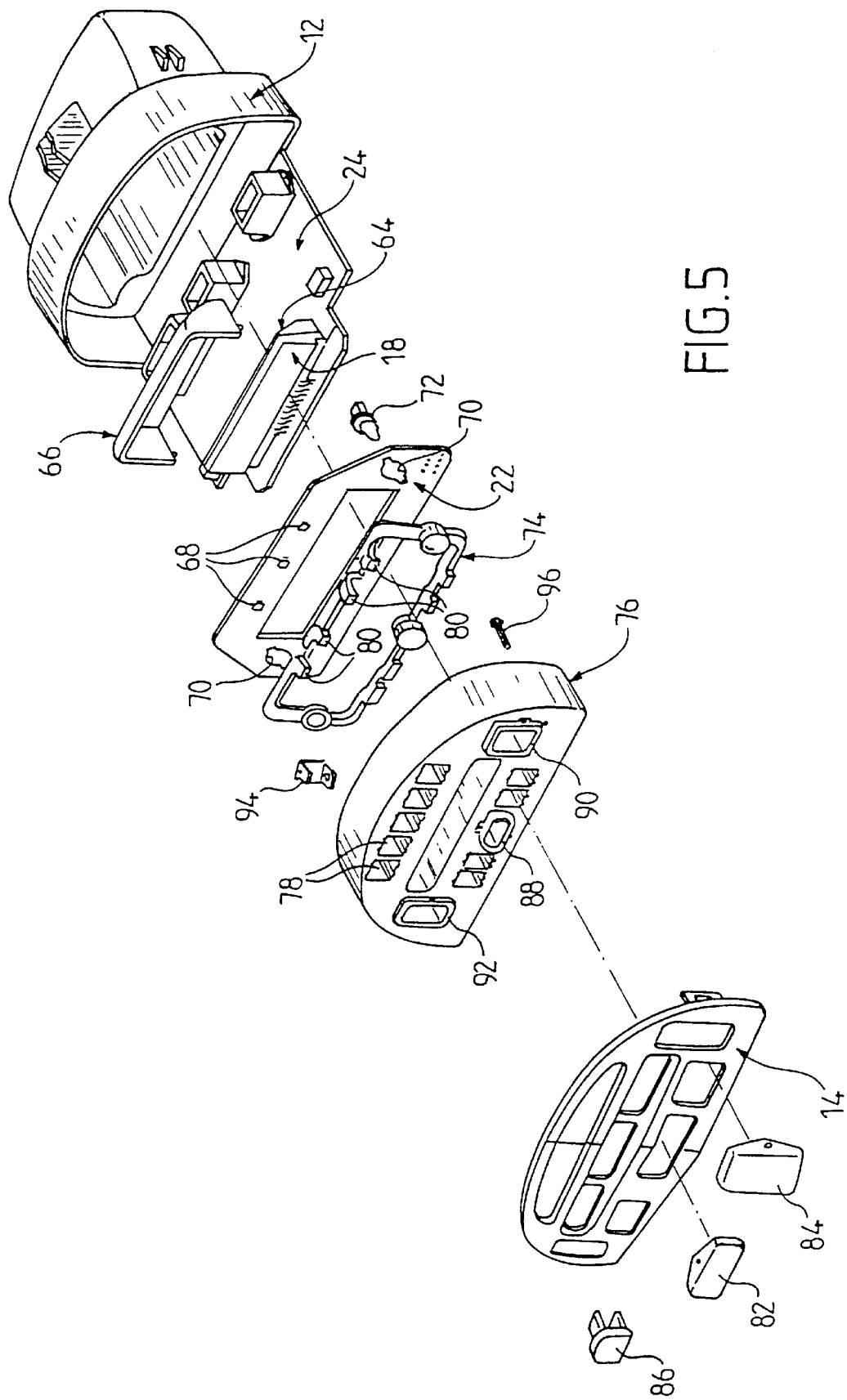
FIG. 5 is an exploded perspective view of another control panel in a second embodiment in accordance with the invention.

Reference is now made to FIG. 5, for a description of a further version of a control panel according to the invention. In FIG. 5 those elements which are also shown in FIGS. 1 to 4 in relation to the first embodiment just described are designated by the same reference numerals.

In FIG. 5, the body 12 is made in the form of an open cap, in a rigid plastics material such as ABS. The liquid crystal type display device 18 is fixed on the computer circuit board 24. A prism 64 of synthetic glass is arranged behind the display device 18. The purpose of the prism 64 is that it shall itself be covered by a light box 66, which is preferably made of a synthetic plastics material of the ABS type.

The front circuit board 22 carries three luminous elements 68, such as light emitting diodes (LEDs), together with two support elements 70, each of which is arranged to support a lamp 72.

The front panel or face panel 14, which is arranged to be placed in front of the mouth of the body 12 in the form of a casing, is made of coloured plastics material, for example of the ABS type.

A light guide 74 and an intermediate block 76 are held trapped between the front circuit board 22 and the front panel 14. The intermediate block 76 has a number of through holes such as those indicated at 78, and portions 80 of the light guide 74 are arranged to penetrate through these holes 78. The intermediate block 76 also has seatings for touch elements, namely, in this example, a switch dolly 82 of the vertical tilt type, a switch dolly 84 of the horizontal tilt type, and a touch button 86. These three touch elements pass through appropriate holes formed through the front panel 14, and constitute elements of a control keypad. The touch elements 82, 84 and 86 are mounted on respective support members 88, 90 and 92 carried by the intermediate block 76. A saddle clip 94 is arranged to retain the support member 92 in position. In addition, a push rod 96 is arranged to extend through the intermediate block 76.

The invention is of course not limited to the embodiments described above by way of example, and does embrace other versions. Thus, for example, it will be understood that the interconnection between the computer circuit board and the front circuit board could be obtained in any other way, for example by means of a flexible braid or the like, of conductive wires.

In addition, although the invention has been described above with particular reference to a control unit for a heating and/or air conditioning installation for a motor vehicle, it can be applied to other kinds of equipment. It may particularly be applicable for example to display panels, multi-function screens, clocks, instrumentation panels, automatic radios, and so on.

What is claimed is:

1. A control unit comprising:

a body;

a front panel carried by the body and having a window;

a printed circuit carried by the body behind the front panel; and a display device connected to the printed circuit and being disposed behind the window, wherein the printed circuit comprises a front circuit board and a computer circuit board, the front circuit board being located behind the front panel and defining a through aperture, the computer circuit board defining a given angle with the front circuit board and including an extension portion extending through the through aperture in the front circuit board, the extension portion carrying the display device, and the unit further comprising retaining means interposed between the computer circuit board and the body, the retaining means being adapted to retain the display device in a defined position with respect to the front panel.

2. A control unit according to claim 1, wherein the given angle is a right angle.

3. A control unit according to claim 1, wherein the front panel has a rear face, the front circuit board being substantially parallel to the rear face and the computer circuit board being substantially at right angles to the rear face.

4. A control unit according to claim 1, further comprising:

interface means carried by the front panel and being selected from the group consisting of a control keypads lighting means and both; and a plurality of electrical contacts carried by the front circuit board for making electrical connection with the interface means carried by the front panel.

5. A control unit according to claim 1, wherein the front circuit board is a single-face printed circuit board, including two opposed electrical connection networks.

6. A control unit according to claim 1, wherein the front circuit board is a double-face printed circuit board.

7. A control unit according to claim 1, wherein the computer circuit board is a double-face printed circuit board.

8. A control unit according to claim 1, further comprising connecting means having at least one pin connector including a set of pins and being carried by a one of the front circuit board and the computer circuit board and at least one socket carried by an other of the front circuit board and the computer circuit board, the socket being adapted for engagement with a corresponding pin connector.

9. A control unit according to claim 8, wherein the at least one socket has contacts adapted to establish mutual electrical contact with the corresponding pin connector.

10. A control unit according to claim 9, wherein the at least one pin connector is carried by the front circuit board and the at least one socket is carried by the computer circuit board.

11. A control unit according to claim 10, wherein the at least one connector and its pins extend at right angles to the front circuit board.

12. A control unit according to claim 8, wherein the connecting means comprise a plurality of flexible electrical conductors.

13. A control unit according to claim 1, wherein the computer circuit board has an oblong through hole and the body has a further hole, the retaining means comprising at least one screw extending through the oblong through hole in the computer circuit board and engaging in the further hole in the body.

14. A control unit according to claim 1, further comprising resilient means engaging the computer circuit board and being adapted to bias the computer circuit board towards the front panel to position the display device.

15. A control unit according to claim 14, wherein the computer circuit board has an edge, the resilient means comprising at least one flexible lug carried by the body and engaging the edge of the computer circuit board.

16. A control unit according to claim 1, wherein the front circuit board is in direct engagement against the front panel.

17. A control unit according to claim 1, further comprising an intermediate block interposed between the front panel and the front circuit board.

18. A control unit according to claim 1, wherein the display device is a liquid crystal type display.

* * * * *